United States Patent [19]

Miller

[11] Patent Number: 5,116,069

[45] Date of Patent: May 26, 1992

[54] THREE-WHEEL VEHICLE

[76] Inventor: Robert H. Miller, 600 Laurel Way, Casselberry, Fla. 32707

[21] Appl. No.: 667,215

[22] Filed: Mar. 11, 1991

[51] Int. Cl.$^5$ ............ B60G 21/00; B62D 61/06
[52] U.S. Cl. .................. 280/112.2; 180/210
[58] Field of Search ......... 180/210; 280/6.12, 840, 280/62, 112.2, 772

[56] References Cited

U.S. PATENT DOCUMENTS

| | | | |
|---|---|---|---|
| 2,126,642 | 8/1938 | Jones | 280/112.2 |
| 2,967,062 | 1/1961 | D'Avigdor | 280/112.2 |
| 3,008,729 | 11/1961 | Muller et al. | 280/112.2 |
| 3,154,320 | 10/1964 | D'Avigdor | 280/112.2 |
| 3,820,812 | 6/1974 | Stubbs et al. | 280/112.2 |
| 4,350,354 | 9/1982 | Dotti et al. | 280/6.12 |
| 4,377,215 | 3/1983 | Hare | 280/772 |
| 4,382,604 | 5/1983 | Nakagawa | 280/6.12 |
| 4,603,882 | 8/1986 | Kijima et al. | 280/701 |
| 4,887,829 | 12/1989 | Prince | 280/112.2 |
| 4,921,263 | 5/1990 | Patin | 280/62 |

FOREIGN PATENT DOCUMENTS 0110509  5/1987  Japan .................. 280/6.12

Primary Examiner—Mitchell J. Hill
Assistant Examiner—Paul Dickson
Attorney, Agent, or Firm—William M. Hobby, III

[57] ABSTRACT

A three-wheel vehicle apparatus has one front wheel and two rear wheels to improve safety of operation, including a novel tilt-and-bank mechanism, front wheel suspension, safety frame, aerodynamic body design, and sliding doors. The tilt-and-band mechanism employs a tilt bar connected to hydraulic cylinders and spring/-shock units mounted on the wheels which automatically tilt and bank the vehicle in turns. The front wheel suspension mounts the front wheel on a trailing arm and uses a reaction arm connected to a pivot pin in front of the wheel for better handling of centrifugal forces in turning. The safety frame employs three crosswise roll bars connected together by three longitudinal bars and connectors, all in turn connected to a complete wrap-around bumper. This vehicle is made aerodynamically more efficient by a pointed nose and a new upswept tail that eliminates rear drag at high speeds. Additionally, doors which can be opened and remain open at high speeds are roller mounted on the outside of the passenger compartments. The improved vehicle is designed to make the use of three-wheel vehicles on today's highways safe and reliable.

4 Claims, 5 Drawing Sheets

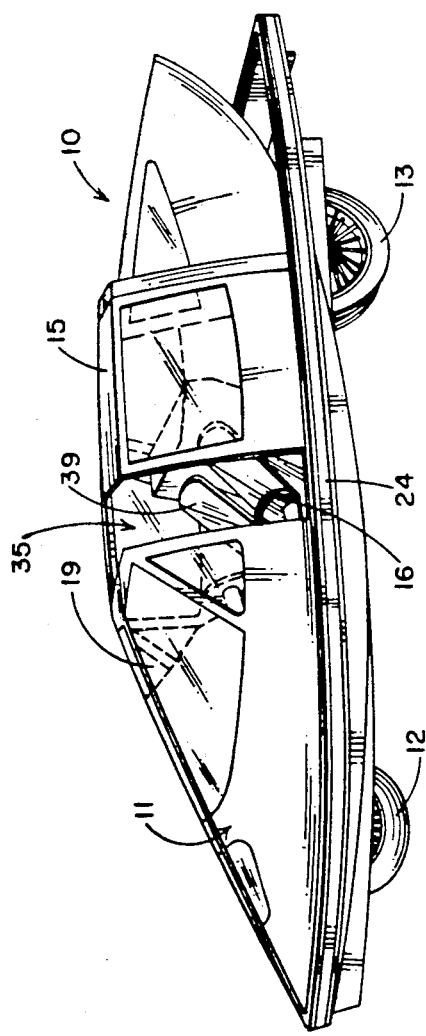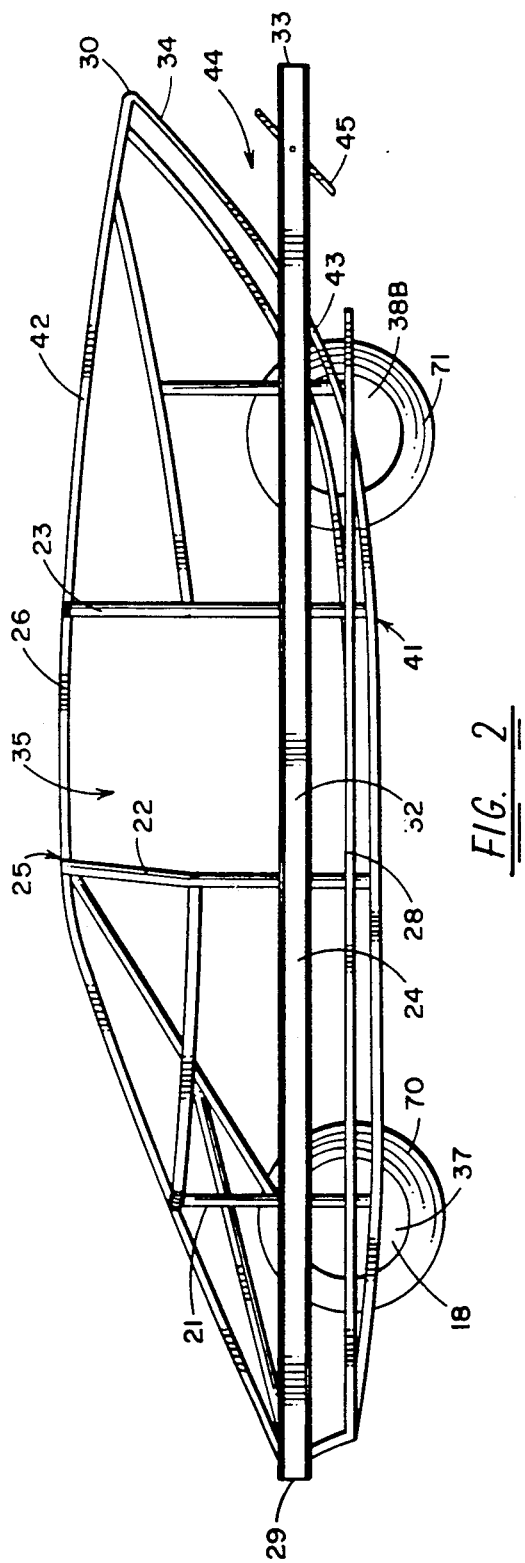

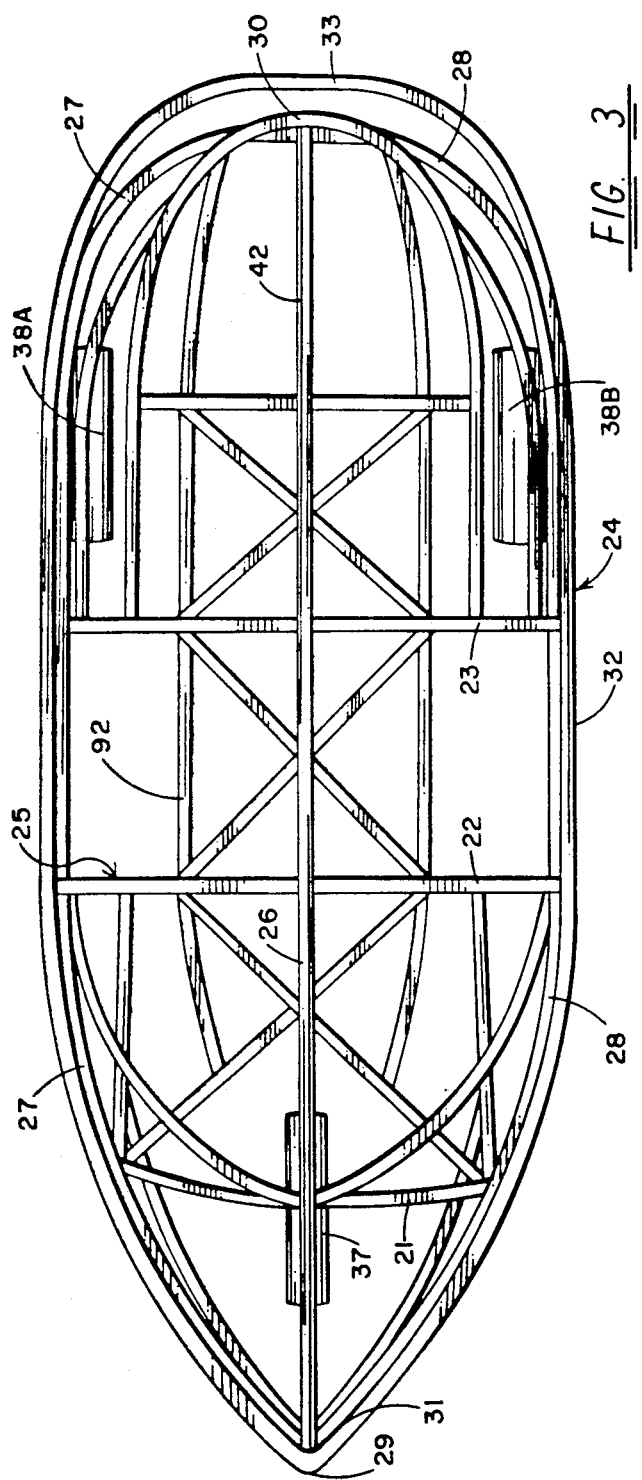
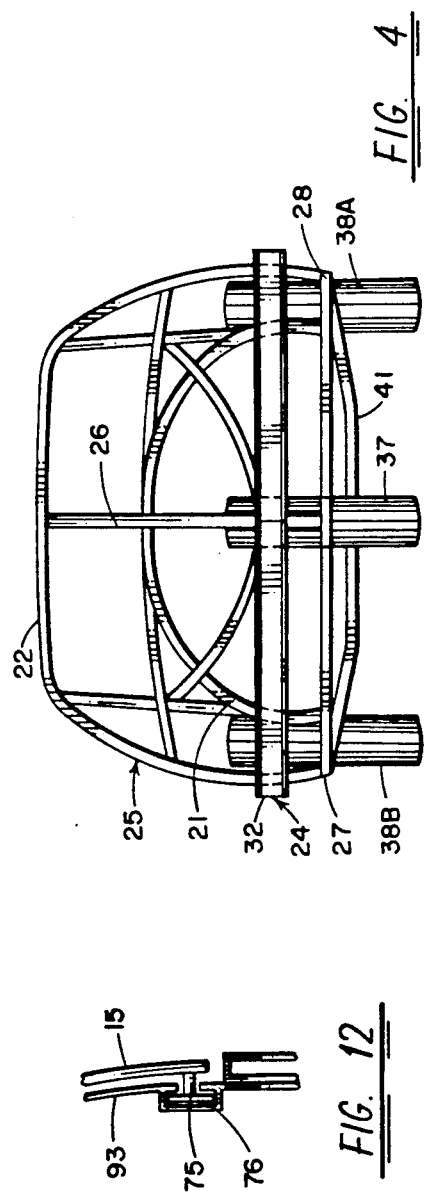

THREE-WHEEL VEHICLE

BACKGROUND OF THE INVENTION

This invention relates to motor vehicles, and more particularly to improvements for three-wheel motor vehicles. These improvements include a tilting mechanism, suspension system, safety frame, sliding door feature and overall improvements in aerodynamic design.

Currently, most motor vehicles on the highways are four-wheel vehicles which are usually larger, heavier and less fuel efficient than three-wheel motor vehicles. Perhaps the reasons that three-wheel vehicles have not caught on is because the public is not aware of the advantages of three-wheel vehicle design. Three-wheel vehicles by nature are more stable than four-wheel vehicles since three points will form a plane under all circumstances, such as seen in a tripod, whereas four points do not. This stability is recognized by the fact that practically all aircraft and space shuttles employ three-point landing gears. Another advantage is that three-wheel vehicles afford nearly ideal wheel loading for maximum tire traction in acceleration and braking situations.

Although a three-wheel motor vehicle may have numerous advantages over four-wheel vehicles, the main drawback of a three-wheel vehicle is that during a turn the centrifugal load of the vehicle is supported by only one wheel rather than two. The centrifugal force tends to overload the outside tire and causes the vehicle to sideslip away from the direction of the turn unless some means of compensation is provided. The one means of compensation is a tilting-and-bank mechanism, which shifts the car's center of gravity to the inside keeping more load on the inside tire.

Numerous prior U.S. patents have disclosed tilting mechanisms, but none like the present invention. For instance, U.S. Pat. No. 4,377,215 dated Mar. 22, 1983 by Hare, shows a substantially three-wheel vehicle which is tilted by a mechanical linkage from the steering column to lever arms. The body and frame tilt while the wheels remain vertical at all times. No hydraulic or electrical means for tilting is provided.

U.S. Pat. No. 4,373,743, dated February by Parsons, Jr., also provides a mechanical tilting mechanism. U.S. Pat. No. 4,550,926 dated Nov. 5, 1985, by MacIsaac, shows a vehicle-suspension system that allows the body and wheels to tilt to the inside of the curve by placing the center of gravity of the body and frame below the vehicle roll center.

Another U.S. Pat. No. 3,746,118, by Altorfer, dated Jul. 17, 1973, utilizes mercury switches activated by electrical switches to energize an electro-actuator to bank a three-wheel vehicle. However, mercury switches are sensitive to road vibrations and are thus not fit to be used for banking purposes.

U.S. Pat. No. 4,600,216 by Burkholder, dated Jul. 15, 1986, provides a steering linkage which rovides for banking in a three-wheel vehicle having two wheels in the front.

Another U.S. Pat. No. 4,624,469 by Bourne, Jr., dated Nov. 25, 1986, shows a three-wheel vehicle which uses a rod between the wheels that rotates through a ninety-degree arc thereby allowing turning and banking at the same time. This vehicle has two front wheels and not one wheel as does the present invention.

Another three-wheel vehicle is shown in U.S. Pat. No. 4,717,164 by Levavi, dated Jan. 5, 19. Contrary to the present invention, it also has two wheels in the front and one in the back and uses manually-actuated hydraulic cylinders to bank the vehicle in turns.

Finally, U.S. Pat. No. 2,787,473, by Chiodo, dated Apr. 2, 1957, discloses a hydraulic stabilizing system for a four-wheeled vehicle.

Although the above-patented inventions have attempted to resolve the problems in turning associated with three-wheel vehicles, the present invention uses an engine driven hydraulic pump to pressurize the hydraulically-operated system to automatically tilt the entire vehicle in a turn, slanting the wheels inwardly in a curve similar to that of a motorcycle. Although a motorcycle with rider usually has a combined higher center of gravity than most automobiles, a motorcycle maintains perfect balance and traction through a turn due to the resultant vector of gravitational and centrifugal forces being balanced by the shifting weight of the rider, which means that the resultant force is constantly applied through the centerline of the combined rider-motorcycle mass. The tilting system of the present invention closely simulates this balancing act by use of either a manual, automatic electro-mechanical or automatic mechanical hydraulic control and actuating system. This tilt system requires only the rear wheels to be raised or lowered hydraulically while the single front-wheel tilts with the body.

Another feature provided by the present invention not present in other three-wheel vehicles is the safety frame. Many types of frames in the prior art have disclosed frames, some with wrap-around structure and some with roll-bars, but none like the present invention. Amongst those U.S. patents are the following: U.S. Pat. No. 4,045,075 to Pulver dated Aug. 30, 1977; U.S. Pat. No. 4,453,763 to Richards dated Jun. 12, 1984; U.S. Pat. No. 2,507,421 to Rose dated May 9, 1950; U.S. Pat. No. 2,612,964 to Hobbs dated Oct. 7, 1952; and U.S. Pat. No. 3,575,251 to Moore dated Apr. 20, 1971.

The safety-frame design of the present invention is novel because it combines a wrap-around bumper with longitudinal tubes on the sides and top with three roll bars and connectors. Plus, the football shape of the vehicle safety frame increases the likelihood that any collision will result in a glancing blow to the vehicle rather than direct hit. Should the vehicle be struck, the blow would be deflected in such a manner that the passengers would remain safe. Further, should the vehicle roll over, the roll-bar construction will completely protect the occupants.

Another problem associated with not only three-wheel vehicles, but also most other automobiles is that associated with opening doors. Most doors swing out and hit other cars or walls and prevent the doors from being opened fully when other cars are parked too close. The prior art includes some designs which might resolve this problem comprising sliding doors such as those contained in U.S. Pat. No. 2,955,872, by Barentyi, dated Oct. 11, 1960; U.S. Pat. No. 3,594,036, by Cadiou, dated Jul. 20, 1971; and U.S. Pat. No. 3,550,948, by Thompson, Jr., dated Dec. 29, 1970. However, the present invention provides for lifting and rolling doors, which move up, back and down through a low arc off of and onto rain seals on the body which seal the vehicle when it is raining. In addition to having the advantage of rolling back and forward, these doors can also be opened partially to provide ventilation for the occupants of the vehicle.

In addition to the above specific features, the present invention also provides a novel aerodynamic body design not found in any other vehicle design. The body of the present invention is designed to incorporate the downward force of an inverted wing with the minimal drag of an airfoil. The design contains a pointed nose, upswept tail, front air dam, and full belly pan and flush glass, which all contribute to improved road holding and a significant reduction of aerodynamic drag and fuel consumption.

Another feature of this invention is the front wheel suspension design which places the king pin ahead of the wheel for improved caster control allowing the vehicle to recover from a turn and maintain straight line travel with greater ease and precision.

The forward king pin also allows the front wheel to swing to the outside in a curve, thus counteracting the overturning centrifugal load by moving the wheel out from the longitudinal center line of the cars front mass and at the same time placing the mass to the inside of the tire patch.

The forward king pin also permits the front of the car to be swung in and out of a parking space faster and with less effort and effectively lengthens the wheel base for a better ride.

Thus, the present invention provides novel systems and designs which alleviates various problems associated with previous designs of three-wheel vehicles, thereby making it possible to build safe three-wheel motor vehicles for widespread passenger use.

The aim of the present invention is to provide a safer three-wheel vehicle for regular highway use.

Another object of the present invention is to provide a safe tilt-and-bank suspension system that will enable three-wheel vehicles to take corners at high speed.

Even another object of the present invention is to provide a safer suspension system for the front wheel that will enable the front wheel to bear centrifugal loads and grip the road better during turns.

A further object of the present invention is to provide a space frame for a three-wheel vehicle that greatly increases the safety of the occupants.

Even another object of the present invention is to provide a design for a three-wheel vehicle that is more aerodynamically efficient and safer from having greater downforce, thus better traction and road handling than present designs.

An additional object of the present invention is to provide a roll back vehicle door, able to remain open while driving to give a convertible effect to the occupants, and which enables the vehicle to be parked in smaller places.

SUMMARY OF THE INVENTION

The present invention provides a novel tilt mechanism, suspension systems, safety frame, aerodynamic body design and roll back doors designed primarily for three-wheel vehicles but also usable on other motor vehicles as well. The tilt mechanism provided herein is a unique hydraulic system which utilizes a tilt bar swivelably mounted to the body and wheels of the vehicle so that the body and wheels tilt when making turns. A front suspension system which works hand-in-hand with the tilting mechanism mounts the wheel to a king or pivot pin in front of the vehicle by a trailing arm using a reaction arm mounted to a pivot block with a shock unit on top of the trailing arm. This front suspension system is unique in that it places the front wheel rearward of the pivoting means, thereby resulting in better load sharing and traction when the vehicle is being turned. The frame for the present invention encompasses a football-shaped frame which uses three roll bars, one each in the front and rear of the passenger compartment and one halfway between the front passenger roll bar and the front end of the vehicle so as to protect the feet and legs of the occupants from injury. The roll bars are connected to a wraparound bumper to three full length longitudinal tubes and to each other by numerous triangulated tubular connectors. The present invention is more aerodynamically efficient due to the sharply sloping V-shaped front portion and sealed underbelly, which reduces air drag over and under the vehicle and, most important, a rear portion having an upwardly sloping tail not connected to the rear of the wraparound bumper so that the major drag force due to rear turbulence is reduced. Two roll back doors are also provided for the three-wheel vehicle which can be used on other vehicles as well. The rolling doors may be opened and remain open while the vehicle is in operation to yield a convertible effect. Said rolling doors are mounted by wheels in channels on the top and bottom of the door so that a backward force with the hand causes the doors to lift up and open and a conversely forward movement causes them to move forward and downward to a closed position.

BRIEF DESCRIPTION OF THE DRAWINGS

Other objects, features and advantages of the present invention will be apparent from the written description and the drawings in which:

FIG. 1 is a perspective view of a three wheel vehicle in accordance with the present invention;

FIG. 2 is a side elevation view of a three-wheel vehicle frame;

FIG. 3 is a top plan view of the three-wheel vehicle of FIGS. 1 and 2;

FIG. 4 is a front elevation of the three-wheel vehicle shown in FIGS. 1, 2 and 3;

FIG. 12 is a sectional view of door opening roller track.

DESCRIPTION OF THE PREFERRED EMBODIMENT

Figure 5:
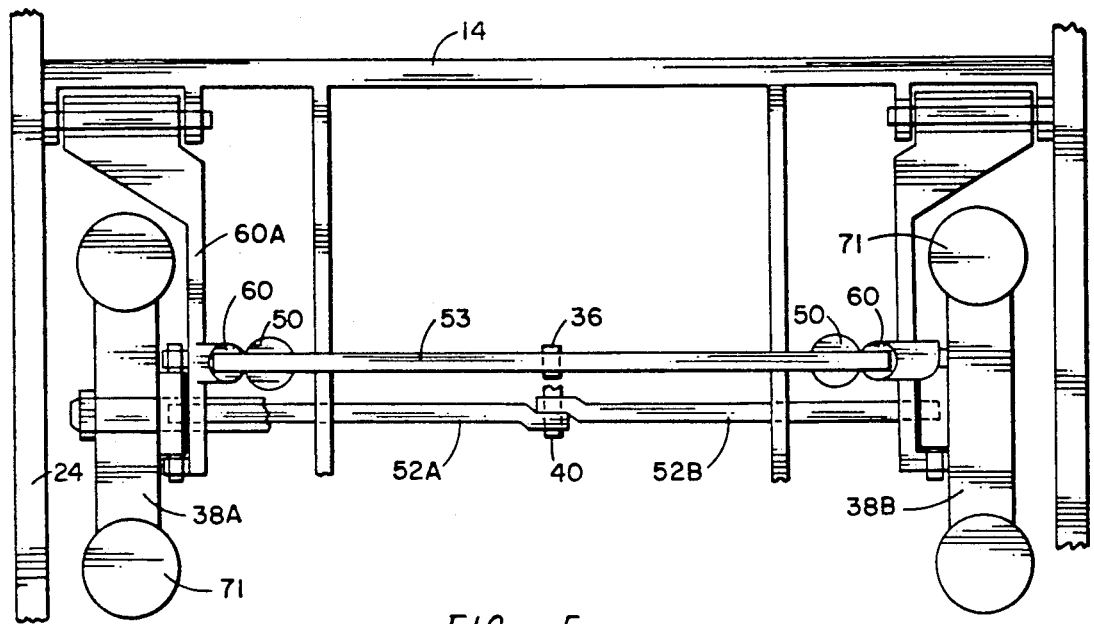
FIG. 5 is a sectional view of the hydraulic suspension tilt mechanism in the rear of the vehicle.

FIG. 1 of the drawings shows a three wheel vehicle 10 having an aerodynamic airfoil body 11 with a front wheel 12 and a pair of powered rear wheels 13. The automobile 10 body 11 has a windshield 19 and a metal channel wrap-around bumper 24 extending around the body 11 and forming a part of the body design. The U-shaped channel allows lights to be placed in the "U" and covered with a clear polymer to maintain the shape while protecting front turn signal parking, brake and tail lights located therein and protected top and bottom by the bars of the "U" flanges. A rollback door 15 is provided to allow entry into the cockpit 35 of the automobile which cockpit has the seats 39 therein and a steering wheel and other controls therein. The roll back door rolls back on cammed tracks as hereinafter described in connection with FIG. 11. The door is mounted on tracks to first lift the door slightly when the door is opened to move the door off of the body seal and then to roll the door backwards in a slightly raised position above the body.

Referring to FIGS. 1–4, the safety frame and special aerodynamic design provided by the three-wheel vehicle 10 is illustrated. The safest race cars use tubular steel roll-cage type construction and the strongest production cars of the past have had heavy steel mainframes under the chassis. The present invention integrates both systems with the added features of putting a front roll-bar 21, forward of the two conventional center and rear roll-bars 22 and 23 to protect the occupants' feet and legs. A wrap-around bumper 24 is provided to protect the vehicle and occupants not shown from intrusions from all directions. This wrap-around bumper 24 is similar to the main frame of regular automobiles except that it has been moved out from under the vehicle to the exterior to act as a true complete wrap-around bumper. The roll-bars 21, 22 and 23 and associated tubular members which comprise the overall roll-cage 25 are attached at nine points along the bumper 24 which greatly increases the strength of both systems. The roll-bars are in turn connected to each other by three heavy connecting tubes or stringers 26, 27, and 28 which run from the nose 29 to the tail 30 of the vehicle and are welded to the three roll-bars 21, 22 and 23 at approximately 120° intervals around the circumference of the roll-bars. The top stringer 26 ties the nose 29 and tail 30 to the top center of each roll-bar, while the other two stringers similarly tie the lower left and right sides of the roll-bars to the nose and tail. The bumper 24 connects at the nose 29 of the vehicle to form a 90° V-shaped or parabolic front bumper connection 31 and curves along an arc on each side to the center roll-bar 22, then relatively parallel to within 30 inches of the rear bumper 33 of the vehicle before curving in. The main purpose of the pointed nose 29 is to avoid or greatly diminish the impact from head-on or left-front or right-front quarter collisions with other vehicles or stationary objects. The side bumpers 32 are intended to minimize side penetration while the upsweep of the tail 34 (after the rear bumper 33 breaks away) provides a tube steel ramp which operates to raise the vehicle upon rear impact thereby allowing for controlled deceleration to minimize G-loads to the occupants which normally result in whiplash injuries to the neck and back of the occupants. The cockpit 35 of the vehicle accommodates the occupants and is designed to keep the occupants from contacting the sides or envelope of the cockpit during a crash, especially while the occupants are in their seats 39 wearing seat belts 16. In addition, all three wheels, front 37 and two rear wheels 38, are located inside of the bumper for maximum protection in a crash. The frame also has a bottom frame 92 formed in a triplex truss design for greater rigidity in the vehicle. The bottom frame 92 is attached to the roll bars and to the longitudinal frame member 27 and 28.

Still referring to FIGS. 1–4, the body 11 is aerodynamically designed to incorporate the down force of an inverted wing with minimal drag. The pointed nose 29, upswept tail 30, full belly pan 41, flush glass (not shown), and covered lights (not shown) all contribute to this concept. The rear deck 42 slopes at an angle of approximately 11° which prevents boundary layer separation and thus eliminates uplift of the tail 30 during high speeds. The upsweep of the rear underbody 43 acts similar to the trailing edge of an inverted wing, which contributes to reducing rear drag by reducing the flat vertical area 44 in the rear, thus permitting the airstream to flow over, under and around the vehicle body to reunite more smoothly. The latter airstream flow reduces the partial vacuum normally created behind the vehicle to reduce rear turbulence and trailing vortices. The main purpose of the rear wing flap 45 is to create an additional down force while deflecting underbody air flow under laminar flow conditions into the low pressure area trailing the vehicle. This flap can be controlled by placing it in different fixed positions or can be interconnected with the brakes to drop the flap responsive to applying the brakes to thereby use the air flow in braking the vehicle. Engine heat and exhaust gases also help fill this void area. High-speed vehicles usually have front air dams and side skirts to divert and prevent air from flowing back under the vehicle. Some vehicles use full belly pans to maintain laminar flow under the full length of the vehicle. Tests indicate that air dams and skirts reduce overall drag by 5% while full belly pans reduce drag by 15%. Thus, both methods have been incorporated into this aerodynamic design to minimize underbody drag.

Expanding on the design of this three-wheel vehicle, in the case of production cars, all wheel rims would be covered on both sides by solid flat discs 18 to eliminate any detrimental wind milling effect common to many present wheel designs. The tread on a rotating tire acts like a centrifugal turbine with the radial flow of air added to forward rotation of the top-front quarter of the tires 70 and 71 which can present a major source of aerodynamic drag. Thus, the present invention has been designed to have less than one-third ($\frac{1}{3}$) of each wheel protrude below the belly pan 41, thereby reducing this main source of wheel drag. Moreover, with a three-wheel vehicle, wheel air drag is already reduced by approximately 25% since there are only three wheels.

Figure 6:
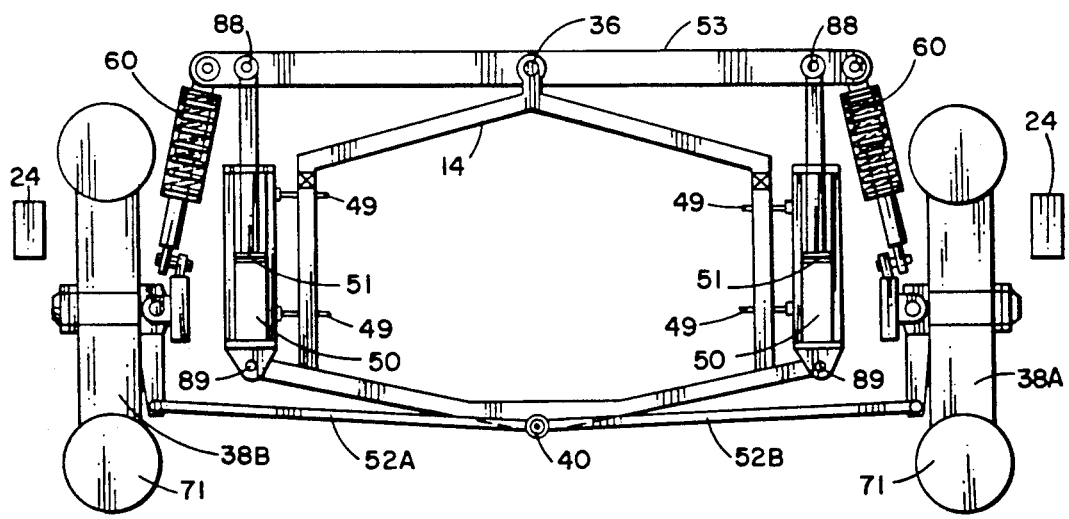
FIG. 6 is a sectional view of the rear hydraulic suspension tilt mechanism in the rear of the vehicle.
Figure 7:
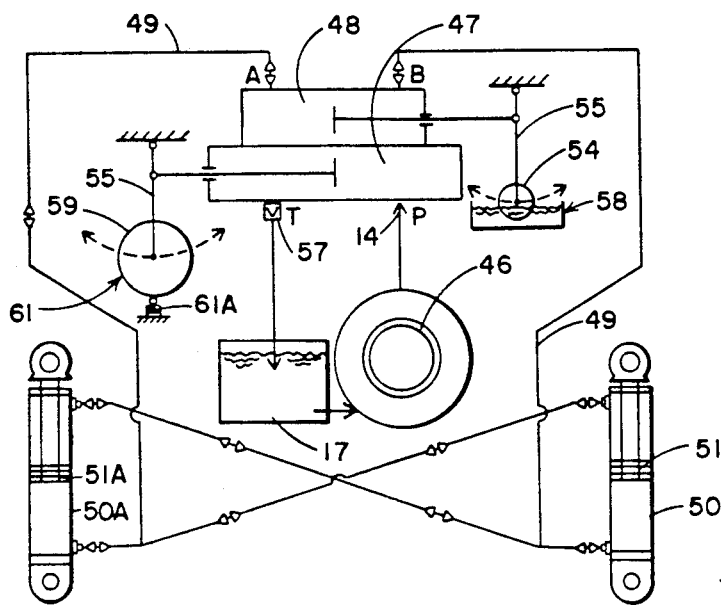
FIG. 7 is a schematic diagram of the hydraulic tilt mechanism in the rear of the vehicle.

Referring now to FIGS. 5, 6, and 7, the rear hydraulic suspension tilt mechanism is illustrated. As best shown in the schematics of FIG. 7, the hydraulic tilt mechanism of the present invention consists of a supply of hydraulic fluid held in a tank 17 which is transferred by means of a hydraulic pump 46 through a main hydraulic valve 47 and a centering or trim valve 48, and through hydraulic lines 49 to opposite ends of the tilt-actuating cylinders 50, to move the hydraulic pistons 51, tilt bar 53 (FIGS. 5 & 6), wheel cone angle control arm 52, and rear wheels 38 either up or down. As the pistons 51 in the cylinders 50 move up and down, the hydraulic fluid on the opposite side of each piston is pushed back through the return or tank ports 57 in the valves 47 and 48 and then back to the tank 17.

The hydraulic components of the present invention are mostly off-the-shelf items, but are interconnected to produce a new valve actuation system. Each standard basic valve is activated by a lever arm pendulum and has three positions. When the lever arms 55 are straight down, the valve is in a neutral position and the hydraulic fluid flows in through the pressure port P (14) and then back through a return to tank port T (57) and to the tank. When the lever arm 55 is moved to the right, the hydraulic fluid flows through port P to port A and through the lines to the bottom of cylinder A and to the top of cylinder B. The result is that the piston in cylinder A moves up while the piston in cylinder B moves down.

Thus, instead of having to manually operate the valves, masses (heavy balls) 54 and 61 are attached to each valve lever arm 55 to create a pair of pendulums, a main pendulum 59 and a damped pendulum 58, which in turn activate each valve automatically by the resistance to the movement or centrifugal force acting on the mass 54 and 61 when the vehicle goes into a turn. A two-valve system is used because two opposite requirements must be met. The main valve 47 controls approximately 90% of the hydraulic fluid flow and must move quickly and freely while the smaller centering or trim valve 48, controls the remaining 10% of the hydraulic fluid, is damped so as to move more slowly. The main valve 47 thus controls the quick major movements of the tilt system while the smaller damped valve 48 controls the smaller movements needed for horizontal trim when the vehicle is in straight-line movement. The main valve pendulum 59 is also lightly restrained in the center position by the valve detent ball 61A to prevent unwanted movement of the pendulum 59 and valve 47 from road irregularities during straight-line movement.

Referring to FIGS. 5 and 6, it can be seen that when one piston 51 is actuated in one direction, the other piston will be actuated in the opposite direction, thereby moving the tilt bar 53 to tilt either up or down and thus raise one wheel 38 while lowering the other wheel 38, along with the shocks and springs 60. The tilt bar 53 is pinned to the frame 14 with the shaft 36 and moves thereon. The wheel camber angle control arms 52a and 52b are pinned to the frame 14 at bottom thereof with pin 40 so that the wheels 38 will shift to the correct camber angle as one wheel is raised and one wheel is lowered to tilt the vehicle. The tilt cylinders are attached with the pins 88 to the tilt bar 53 and with pins 89 to the frame 14 so that the tilt bar 53 is shifted relative to the frame 14 responsive to the hydraulic controls of FIG. 7.

Figure 9:
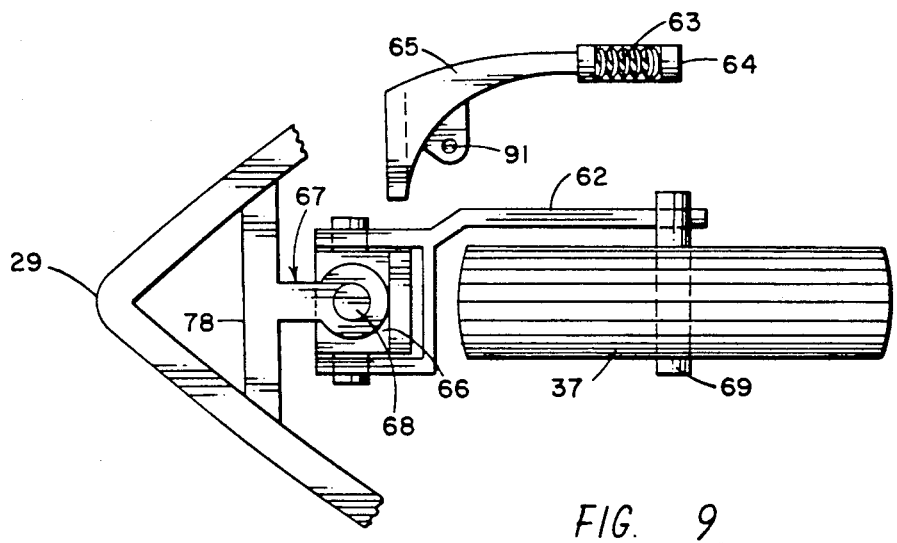
FIG. 9 is a partial cross-section of the front wheel suspension and pivot system.
Figure 8:
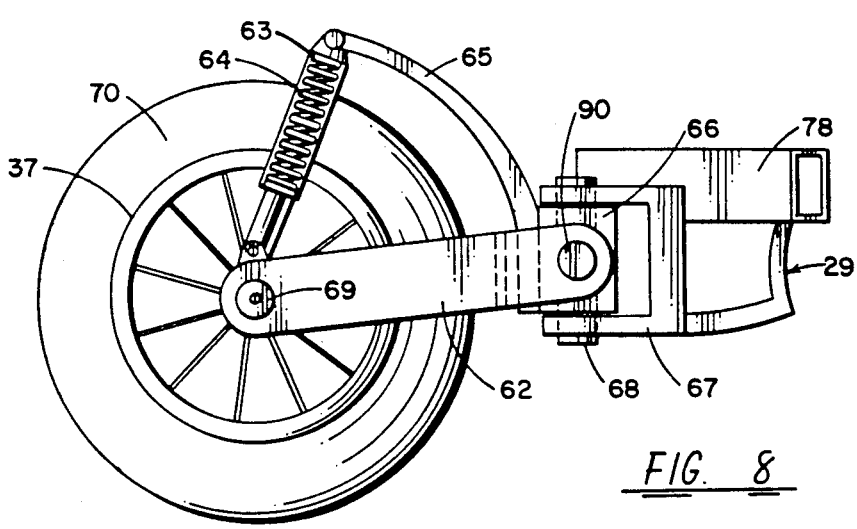
FIG. 8 is a side elevation of the front wheel suspension and pivot system.

Referring to the FIGS. 8 and 9, the front-wheel suspension is illustrated. The front wheel 37 is attached by a single trailing arm 62, rotatably pinned with pin 90 and supported by a single coil spring 63 over a shock unit 64, which in turn is supported by a reaction arm 65 attached to a pivot block 66. The pivot block 66 is held by a U-shaped yoke 67 attached to the main vehicle frame 78. The trailing arm 62 and front wheel 37 can move up and down or left and right. The reaction arm 65 can only move left or right when steering the trailing arm and wheel and has opening 91 for connecting the rack and pinion limb.

The main difference between the present invention and conventional front suspensions like that found in a motorcycle, is that the vertical centerline of the king or pivot pin 68 is located in front of the wheel axle 69 rather than intersecting the axle. This special design offers three advantages: 1) by placing the king pin 68 forward of the front wheel 37, the front wheel swings to the outside of the longitudinal centerline of the vehicle in a turn, thereby picking up some of the overturning load caused by centrifugal force; 2) as the nose 29 of the vehicle also turns about the vertical centerline of the front wheel 37, the load carried by the wheel is smoothly rotated into a tighter circle than the turning circle of the front wheel 37, rather than the reverse situation that occurs in conventional systems. This design not only shifts the load to the inside of the tire 70 for better tire loading and grip, but also anticipates the shifting of vehicle mass away from the straight-line direction to overcome its inherent inertial forces sooner and more smoothly; and 3) the forward king pin 68 also provides a unique advantage when parallel parking. This design allows the vehicle to be backed into the space at a 30° angle and then aligned by steering toward the curb, thereby rotating the nose 29 into place, alleviating the normal time and skill to back into a tight parking space. The reverse maneuver also allows easy exiting from the parking space.

Figure 10:
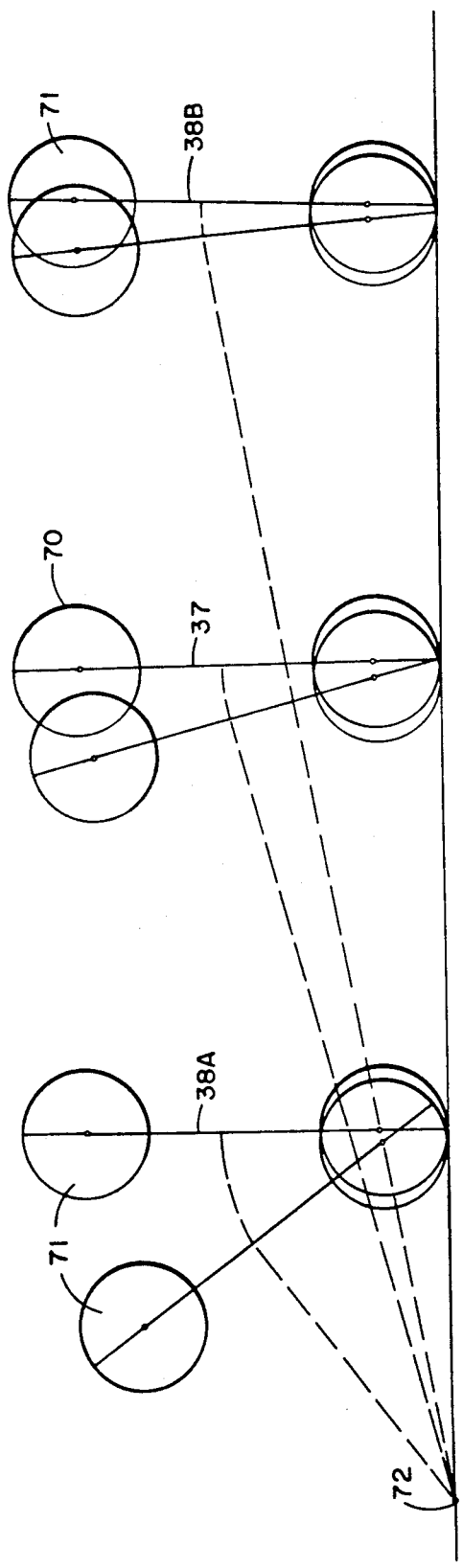
FIG. 10 is a graphic schematic diagram showing angles of controlled lean about a central pivot point using the tilt suspension system of the present vehicle.

The operation of the above-described tilt system comprising the rear-hydraulic suspension system and the special front-wheel suspension system is illustrated in the graphic schematic form in FIG. 10. In FIG. 10, the respective camber angles of the three wheels in a left-hand turn are illustrated. It is noted that the wheels cone about the same controlled lean centerpoint 72 providing an automatically controlled all wheel steering effect. The left wheel 38a, which is closer to the inside of the turn, is slanted at a greater angle relative to the center front wheel 37, which is angled slightly less, and outside of right wheel 38b, which is angled the least. Current automobile suspension systems allow all wheels to lead outwardly which in turn results in loss of traction, excessive tire scuffing and wear. Thus, current mechanisms result in the wheels fighting the automobile in the turn rather than assisting the automobile through the turn.

Figure 11:
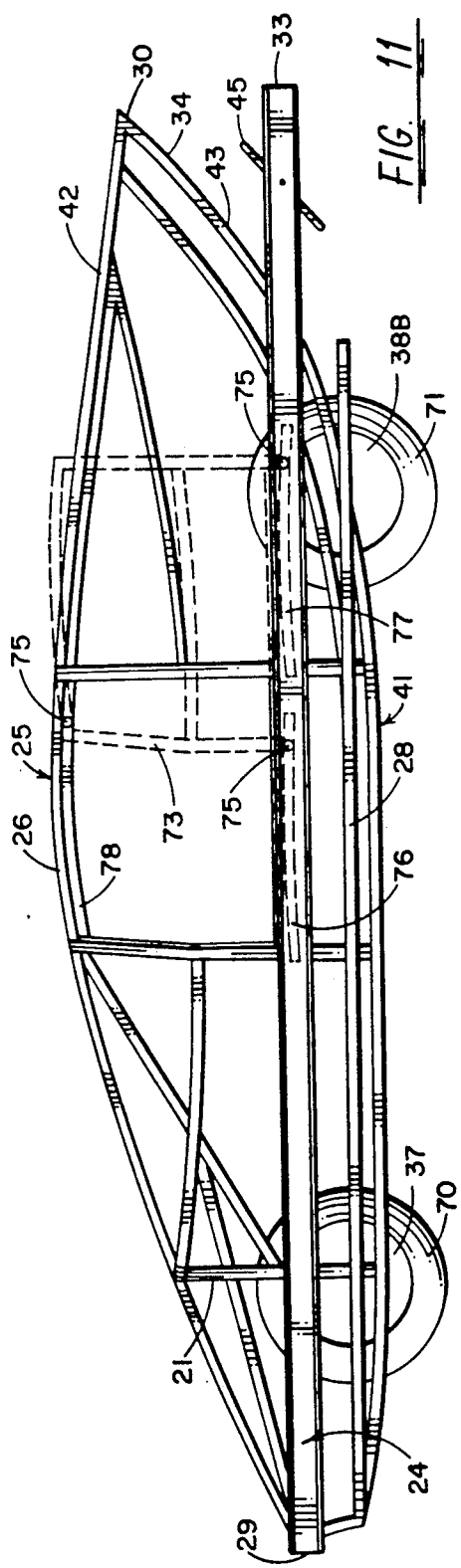
FIG. 11 is a side elevation showing the roll back door assembly for the three-wheel vehicle.

FIGS. 11 and 12 together show another feature of the present invention. A rollback door 15 with door frame 73 enables the vehicle to be parked in tight places as well as allows the doors to be opened during operation to give a convertible affect to the vehicle. The roll back doors contain rollers 75 at the bottom and top that enable the door frame 73 to be rolled along arched tracks 76 and 77 on the bottom and 78 on the top when opening or closing the door. When closed, the doors are in a forward downward position and may be opened by pushing back with one hand which causes the doors to roll upward away from the seals and then backward. The rolling doors offer the advantages of a hard-top convertible with the advantage that it may be opened and closed at any speed. These doors also eliminate the problem with swing-out doors, which hit other cars or garage walls when parked. In comparing these twin doors with the single retracting canopy existing with many other three-wheel vehicles, these twin doors provide the advantages of having at least one door free for escape in the case of a roll over. Moreover, these doors allow both the driver and passenger to adjust his or her door independently to any position for the Furthermore, the doors can be latched into place at any point along the channels. The tracks are shaped to position and then to continue rolling backward to any desired position. In FIG. 12, the door 15 has a roller 75 attached thereto and rolling in the track 76. The tracks 76 are attached to the frame and have the body surface 93 attached thereto.

It should be apparent from the above-detailed description of the preferred embodiment of this invention that the present invention provides a three-wheel vehicle design and system that offers a safer three-wheel vehicle, which can be utilized by the general public for standard highway use. This vehicle is lighter and more aerodynamically efficient than current three-wheel or four-wheeled designs, and will save considerable energy over conventional designs.

Although detailed descriptions of preferred embodiments of this invention have been set forth hereinabove, all modifications or changes thereto within the spirit and scope of the accompanying claims are considered part of this invention.

I claim:

1. A tilting mechanism for a three-wheel vehicle of the type having one front wheel and two rear wheels and a mainframe, said tilting mechanism comprising:
   a tilt bar attached to the mainframe by a central pivot pin, said tilt bar running transverse from one side of the main frame to an opposite side thereof;
   two fluid cylinders, each one attached between said tilt bar and said mainframe;
   a fluid pump connected to a supply of fluid;
   fluid valve means for shifting the fluid from one to the other fluid cylinder;
   a pair of suspension springs, one of each of said springs being connected to one end portion of said tilt bar;
   a pair of shock absorbers, one of each of said pair being connected to one end of said tilt bar;
   a pair of trailing arms, each pivotally attached to said mainframe and each having a fore and aft end, the aft end of each trailing arm being connected to one said suspension spring and to one said shock absorber whereby the suspension springs and shock absorbers are connected between the tilt bar and the trailing arms; and
   control means for tilting said vehicle during a turn, said control means being coupled to said fluid valve means to thereby actuate said two fluid cylinders to shift said tilt bar and thereby tilt said three wheel vehicle.

2. The tilting mechanism of claim 1 wherein the control means for tilting said vehicle includes at least one valve and a lever attached to said at least one valve, said lever having a mass attached thereto, said lever being moved by centrifugal force to thereby activate said valve means when the vehicle goes into a turn.

3. The tilting mechanism of claim 1, wherein the tilting mechanism comprises two hydraulic valves, a first main valve that controls most of the fluid supply, and a second smaller valve which controls the remainder of the fluid supply, the first main valve controlling rapid movements of the tilt bar while the second smaller valve controls slow leveling movements of the tilt bar to thereby dampen the action of the tilting mechanism when the vehicle is moving forward in a generally straight line.

4. The tilting mechanism of claim 1 wherein the two fluid cylinders are two hydraulic cylinders and the two hydraulic cylinders are actuated by hydraulic fluid delivered by said fluid pump controlled by a manual pendulum arm operating a hydraulic valve to shift the fluid supply between the hydraulic cylinders depending on whether the vehicle is turning left or right.

* * * * *